US012693233B2

(12) United States Patent
Thomas, III et al.

(10) Patent No.: US 12,693,233 B2
(45) Date of Patent: Jul. 28, 2026

(54) PIXEL DEVIATIONS

(71) Applicant: Hewlett-Packard Development Company, L.P., Spring, TX (US)

(72) Inventors: Fred Charles Thomas, III, Fort Collins, CO (US); Joshua Alan St. John, San Diego, CA (US); Santiago Garcia-Reyero Vinas, San Diego, CA (US); Miles Maxwell Claver, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

(21) Appl. No.: 18/913,592

(22) Filed: Oct. 11, 2024

(65) Prior Publication Data

US 2026/0104363 A1 Apr. 16, 2026

(51) Int. Cl.
*G01N 21/88* (2006.01)
*H04N 23/56* (2023.01)

(52) U.S. Cl.
CPC ..... *G01N 21/8806* (2013.01); *G01N 21/8851* (2013.01); *H04N 23/56* (2023.01); *G01N 2021/8896* (2013.01); *G01N 2201/06106* (2013.01)

(58) Field of Classification Search
CPC ........... G01N 21/8806; G01N 21/8851; G01N 2021/8896; G01N 2201/06106; H04N 23/56; G06T 7/00
See application file for complete search history.

(56) References Cited

U.S. PATENT DOCUMENTS

| | | | | |
|---|---|---|---|---|
| 9,955,551 B2 * | 4/2018 | Spero | ..................... | H05B 3/008 |
| 10,241,056 B2 * | 3/2019 | Matsuda | ........... | G01N 21/8806 |
| 2015/0355101 A1 * | 12/2015 | Sun | ......................... | G06T 7/586 |
| | | | | 348/46 |
| 2015/0358602 A1 * | 12/2015 | Mayumi | ................ | H04N 23/56 |
| | | | | 348/46 |
| 2017/0186148 A1 * | 6/2017 | Uemura | ................. | H04N 23/56 |
| 2021/0112647 A1 * | 4/2021 | Coleman | ................. | G01S 17/42 |

FOREIGN PATENT DOCUMENTS

| | | | | | |
|---|---|---|---|---|---|
| AT | 516687 A1 | * | 7/2016 | ............. | G07D 7/206 |
| CN | 1242526 A | * | 1/2000 | ............. | G03B 27/72 |
| EP | 3054429 B1 | * | 8/2022 | .......... | G07D 7/0032 |
| WO | WO-2014020289 A1 | * | 2/2014 | ............. | G01N 21/21 |
| WO | WO-2017077277 A1 | * | 5/2017 | ............. | G06T 17/00 |

* cited by examiner

*Primary Examiner* — Abdullahi Nur
(74) *Attorney, Agent, or Firm* — Quarles & Brady LLP

(57) ABSTRACT

In an example, a photometric imaging device comprises a light source to illuminate a target area including a set of fiducials, an imaging device to capture images of the set of fiducials illuminated by the light source with different image viewing settings, and a controller. The controller is to: control the light source to subsequently illuminate the set of fiducials with the different image viewing settings; determine locations of the set of fiducials on the captured images; determine pixel deviations between the determined locations; and determine offset data based at least in part on the determined pixel deviations.

20 Claims, 8 Drawing Sheets

Timing Belt
404

Stepper
Motor
402

Absolute Rotary
Position Encoder
406

314
Linear Polarizer

400

706

708

702

704

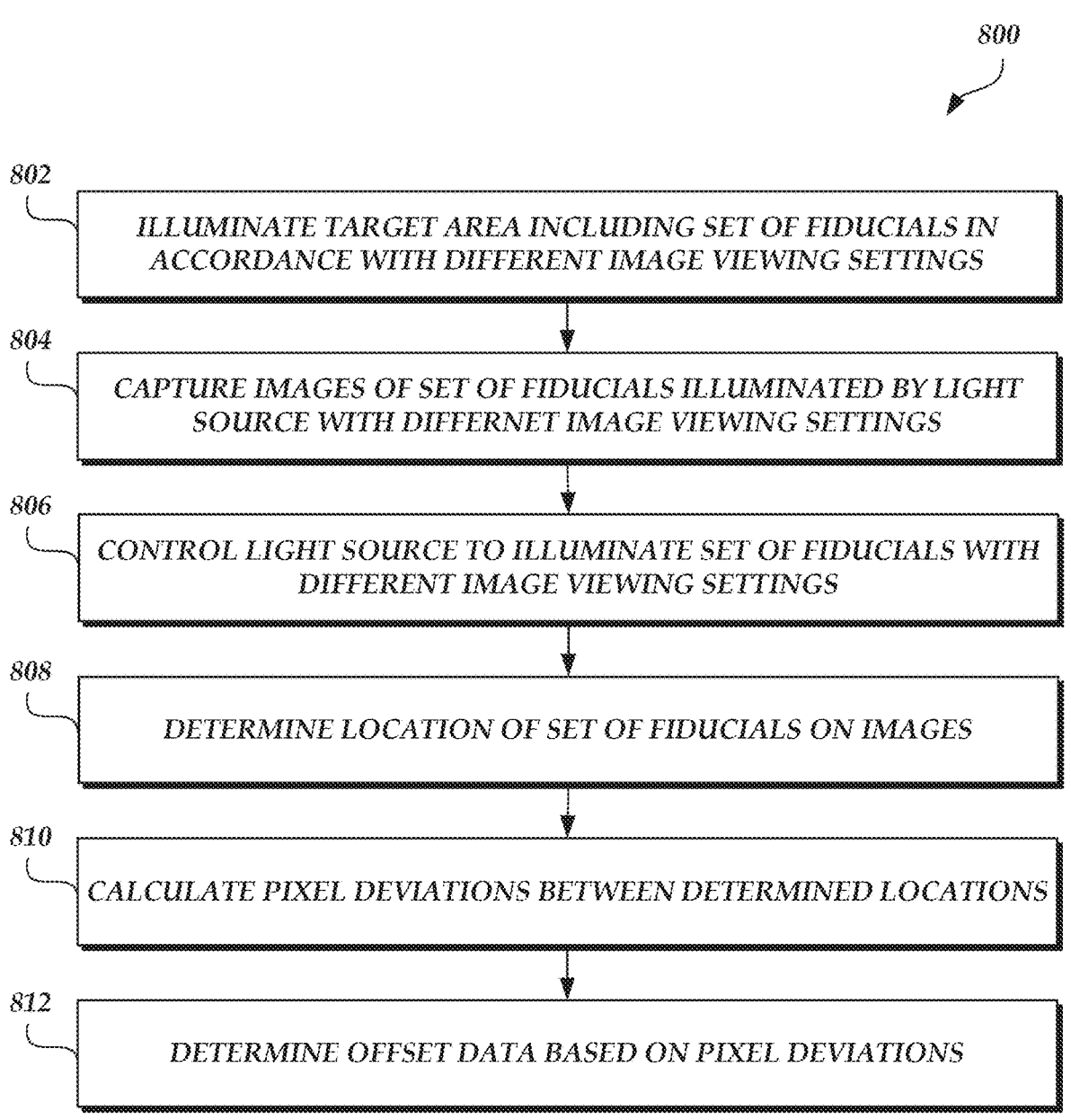

*800*

*802*

ILLUMINATE TARGET AREA INCLUDING SET OF FIDUCIALS IN ACCORDANCE WITH DIFFERENT IMAGE VIEWING SETTINGS

*804*

CAPTURE IMAGES OF SET OF FIDUCIALS ILLUMINATED BY LIGHT SOURCE WITH DIFFERNET IMAGE VIEWING SETTINGS

*806*

CONTROL LIGHT SOURCE TO ILLUMINATE SET OF FIDUCIALS WITH DIFFERENT IMAGE VIEWING SETTINGS

*808*

DETERMINE LOCATION OF SET OF FIDUCIALS ON IMAGES

*810*

CALCULATE PIXEL DEVIATIONS BETWEEN DETERMINED LOCATIONS

*812*

DETERMINE OFFSET DATA BASED ON PIXEL DEVIATIONS

*FIG. 8*

PIXEL DEVIATIONS

BACKGROUND

Photometric imaging devices facilitate the acquisition of surface and/or material information of a sample, which can be used in subsequent processes (e.g., rendering processes). Photometric imaging devices can include a plurality of components, such as an imaging device and a light source. The resulting images can be used to derive various physical characteristics relating to the surface of the sample.

SUMMARY

The systems, methods, and devices of this disclosure each have several innovative aspects, no single one of which is solely responsible for all of the desirable attributes disclosed herein. Details of one or more implementations of the subject matter described in this specification are set forth in the accompanying drawings and descriptions below.

In some aspects, the techniques described herein relate to a photometric imaging device, comprising: a light source to illuminate a target area including a set of fiducials in accordance with different image viewing settings, wherein the different image viewing settings comprise different directions of the light source being emitted towards the set of fiducials; an imaging device to capture images of the set of fiducials illuminated by the light source with the different image viewing settings; and a controller to: control the light source to subsequently illuminate the set of fiducials with the different image viewing settings; determine locations of the set of fiducials on images captured by the imaging device at the different image viewing settings; calculate pixel deviations between the determined locations; and determine offset data based at least in part on the pixel deviations.

In some aspects, the techniques described herein relate to a photometric imaging system, comprising: a plurality of lamps; an imaging device to capture images of a fiducial illuminated by lamps from different relative locations; a polarizer to provide a plurality of polarizer view states; and a controller to: determine locations of the fiducial on the images, the images captured by the imaging device at the plurality of polarizer view states and illuminated by the lamps from the different relative locations; calculate pixel deviations between the determined locations; determine offset data based at least in part on the pixel deviations; and store the determined offset data for use in a photometric imaging operation of a sample in the photometric imaging system.

In some aspects, the techniques described herein relate to a non-transitory computer-readable medium storing specific computer-executable instructions that, when executed by a processor of a computing device, cause the computing device to at least: capture, by an imaging device, images including a set of fiducials illuminated by a light source under a plurality of image viewing settings, wherein the plurality of image viewing settings includes illumination from a light source from different directions; determine locations of the set of fiducials on the images; calculate pixel deviations between the locations of the set of fiducials on the images; and determine offset data based at least in part on the pixel deviations.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 8 illustrates an example routine for execution of a calibration operation of the photometric imaging system.

DETAILED DESCRIPTION

Figure 1A:
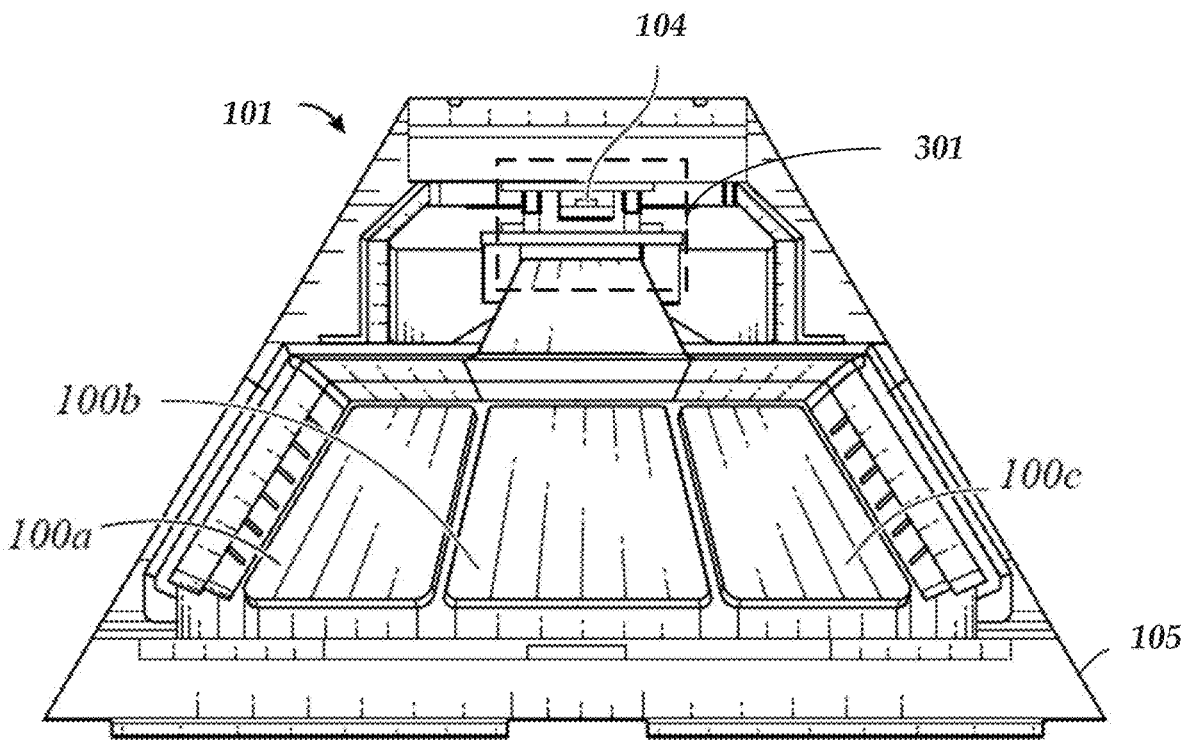
FIG. 1A illustrates a partial schematic top view of a photometric imaging apparatus with three lamps and an imaging device in accordance with some examples of the present disclosure.

Physically based rendering ("PBR") is a graphics technique that seeks to virtualize the appearance of a material surface in a way that models the light and surfaces reflective characteristics as would be viewed in the real world. To provide an accurate representation of how light interacts with material properties, PBR-based systems may utilize photometric imaging devices to render real-world samples in a virtual environment. For example, a photometric imaging device, such as a photometric stereo imaging device, may include multiple light sources for illuminating a sample and an imaging device (e.g., a camera) to acquire or capture images of the illuminated sample under different lighting orientation and conditions. Polarizers (e.g., rotating linear polarizers) can be used in front of the imaging device to measure the degree to which light reflected from a surface is specular or diffuse.

Typically, the mechanical movement of polarizers (e.g., rotating linear polarizers) and/or other components in photometric imaging systems can introduce pixel deviations and image shifting in the resulting captured image data. This can occur due to the misalignment between the polarizing axis of the polarizer and the imaging device itself. Other factors, such as the gradual degradation of the polarizer from exposure to heat and humidity, scratches or abrasions, or prolonged exposure to intense light (from integrated light sources) may also result in optical property changes and pixel shift. Some additional non-limiting examples of causes of pixel shift that may generate the need for pixel shift correction between images may include: camera lens temperature change, which may induce changes in the lens focal characteristics; insertion or inclusion of optical color/wavelength filters; inclusion of active electro-optic elements, such as a liquid crystal (LCD) polarization compensator; and environment vibration of the image capture environment. As such, the introduction of pixel deviations may have a negative impact on the images resulting from the imaging operation.

As will be appreciated by one of skill in the art in light of the present disclosure, the embodiments disclosed herein improve the ability of imaging systems, such as the photometric imaging system, to execute calibration operations to correct pixel deviations. By calculating a pixel deviation based on the location of fiducials on various images, the photometric imaging device can determine offset data corresponding to a calibration adjustment or operation. In some embodiments, a photometric imaging device can include a built-in micro-stage (e.g., micro-actuator) to move the lens of the imaging device relative to the imager of the imaging device (e.g., a camera) based on the determined offset data. In some examples, the imaging device may be moved relative to the lens based on the determined offset data. In some other examples, the photometric imaging device can execute a pixel shift image processing task on subsequent images to account for pixel deviations. In some examples, calibration can occur at the beginning of each image capturing operation performed by the photometric imaging device. This may allow continuity and consistency among the images captured by the photometric imaging device across various illumination viewing settings.

Figure 1B:
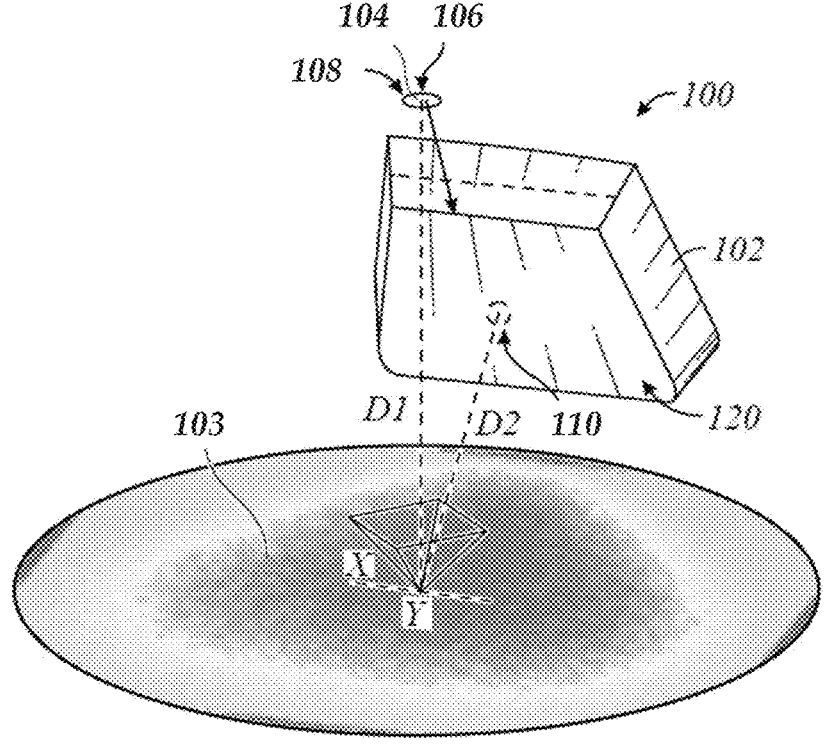
FIG. 1B illustrates a schematic perspective view of a lamp oriented at an angle relative to a target area in accordance with some examples of the present disclosure.

Various examples disclosed herein relate to a near-light light source (e.g., illuminator or near-light illuminator) that can be used in a near-light system or device (e.g., near-light apparatus, or photometric imaging system), or an imaging method. FIGS. 1A-1B illustrate different views of a lamp 100 in a light box 102 (e.g., casing or frame) that can be used in an imaging device (e.g., near-light photometric imaging apparatus or imaging apparatus). In FIG. 1A, a perspective cross-sectional view of a lamp 100 that can be used in a imaging apparatus 101 (e.g., near-light imaging apparatus) or in a near-light device is shown. In some examples, the lamp 100 (e.g., a light emitting diode (LED) light-box panel) can include multiple layers (e.g., first layer, second layer) having multiple functions.

In some examples, and as shown in FIG. 1A and FIG. 1B, an imaging apparatus 101 (e.g., near-light imaging apparatus) can include a lamp 100. The lamp 100 may include one or more of the embodiments described in U.S. application Ser. No. 18/785,682, which was filed on Jul. 26, 2024, and is hereby incorporated by reference in its entirety for all purposes. In some examples, the imaging apparatus 101 can include at least one lamp which can have the structure of the lamp 100. In FIG. 1A, three lamps (100a, 100b, 100c) are illustrated in a cross-sectional perspective view of the interior of an imaging apparatus 101. The individual lamps can be oriented at an angle relative to a target area 103 as shown in FIG. 1B. For example, a lamp 100 in the imaging apparatus 101 can be positioned to have a grazing angle of approximately 30° with respect to the target area 103. In some cases, the lamp 100 can be positioned to have a grazing angle in a range of approximately 10°-70° with respect to the target area 103. The individual lamp(s) can be fixed on an interior surface of the imaging apparatus 101. In some examples, the imaging apparatus 101 may include a single lamp (e.g., lamp 100) that is a movable lamp that can be moved to different positions relative to the target area 103. In some other examples, the imaging apparatus 101 may include between two and eight lamps, where an individual lamp is in a fixed position relative to the target area 103. In some cases, the imaging apparatus 101 may include less than ten lamps, or less than twelve lamps. Implementing a greater number of lamps (e.g., eight) can help increase the amount of information collected pertaining to the surface of a sample, improving the quality of the imaging data collected. It is noted that some elements in FIG. 1A have been omitted in FIG. 1B.

Lamp 100 may operate according to various light settings. As described herein, light setting refers to a set of parameters implemented by a lamp (e.g., lamp 100) during an image acquisition process. The set of parameters can include at least one of a brightness level, an orientation of the light to be emitted towards the sample, or a position or configuration of a polarizer to polarize the output of the lamp 100, the wavelength and/or color-temperature of the lamp 100, among others. In some examples, a single lamp can provide different light settings. In other examples, when having multiple lamps, different light settings may be implemented by each of the lamps.

The imaging apparatus 101 can also include an imaging device 104 capable of capturing an image of a sample illuminated by a lamp 100. The imaging device 104 can be an imager, such as a camera. For example, the camera can be a color complementary metal-oxide semiconductor (CMOS) imager. In some examples, the camera can include approximately between 20 MP and 200 MP. In some examples, the camera includes 108 MP. In some examples, the imaging device 104 can include a 7-lens element for high fidelity images over a target area, an optical image stabilizer, and/or focusing capabilities that can include autofocusing capabilities or manual focusing capabilities. In some examples, the imaging device 104 can be a mobile phone camera module. In some cases, the imaging apparatus 101 can include more than one imaging device 104. For example, the imaging apparatus 101 can include two imaging devices 104 (e.g., two cameras) to allow for dual photometric stereo sampling and adding the capability of 3D stereo vision true depth measurement to the system. In some cases, the imaging device 104 may be removable. For example, the imaging apparatus 101 can include an element (e.g., a mount, imaging device holder, etc.) or a receptacle to receive the imaging device 104, which can facilitate placement of the imaging device 104 along an imaging axis 106. Controller 301 may be a components of the image processing system, specifically a component of the imaging apparatus 101. In some embodiments, the controller 301 receives and sends instructions from various components of the image processing system. For example, the controller may control the light source to subsequently illuminate the set of fiducials with the different image viewing settings. In some embodiments, the controller 301 can determine locations of the set of fiducials on images captured by the imaging device at the different image viewing settings. In addition, the controller 301 can calculate pixel deviations between the determined locations and can determine offset data based at least in part on the pixel deviations.

As shown in FIG. 1B, the imaging device 104 of the imaging apparatus 101 can be placed parallel to an imaging axis 106 that is perpendicular to the target area 103. In particular, the imaging device 104 can be located at a position 108 relative to the lamps (e.g., lamp 100) and the target area 103. The imaging device 104 can be located a first distance D1 away from the target area 103. D1 can be a distance in a range of approximately 10 cm-1000 cm. A lamp 100 having a center 110 (indicated by the dashed circle in the figure), can be positioned relative to the target area 103, such that the center 110 is a second distance D2 away from an edge of a sample on the target area 103. D2 can be a distance proximate to the edge of the sample being viewed in a range of approximately 0 cm-500 cm from the edge of the sample. Further, although FIGS. 1A-1B illustrate a lamp 100 having an approximately trapezoidal shape, the lamp 100 can take on other shapes. For example, lamp 100 can be rectangular, triangular, or circular, among other shapes. In some embodiments, the linearly polarized light can be transmitted through an anti-reflective film 120 disposed on the front surface of the lamp.

Figures 2A, 2B, 2C:
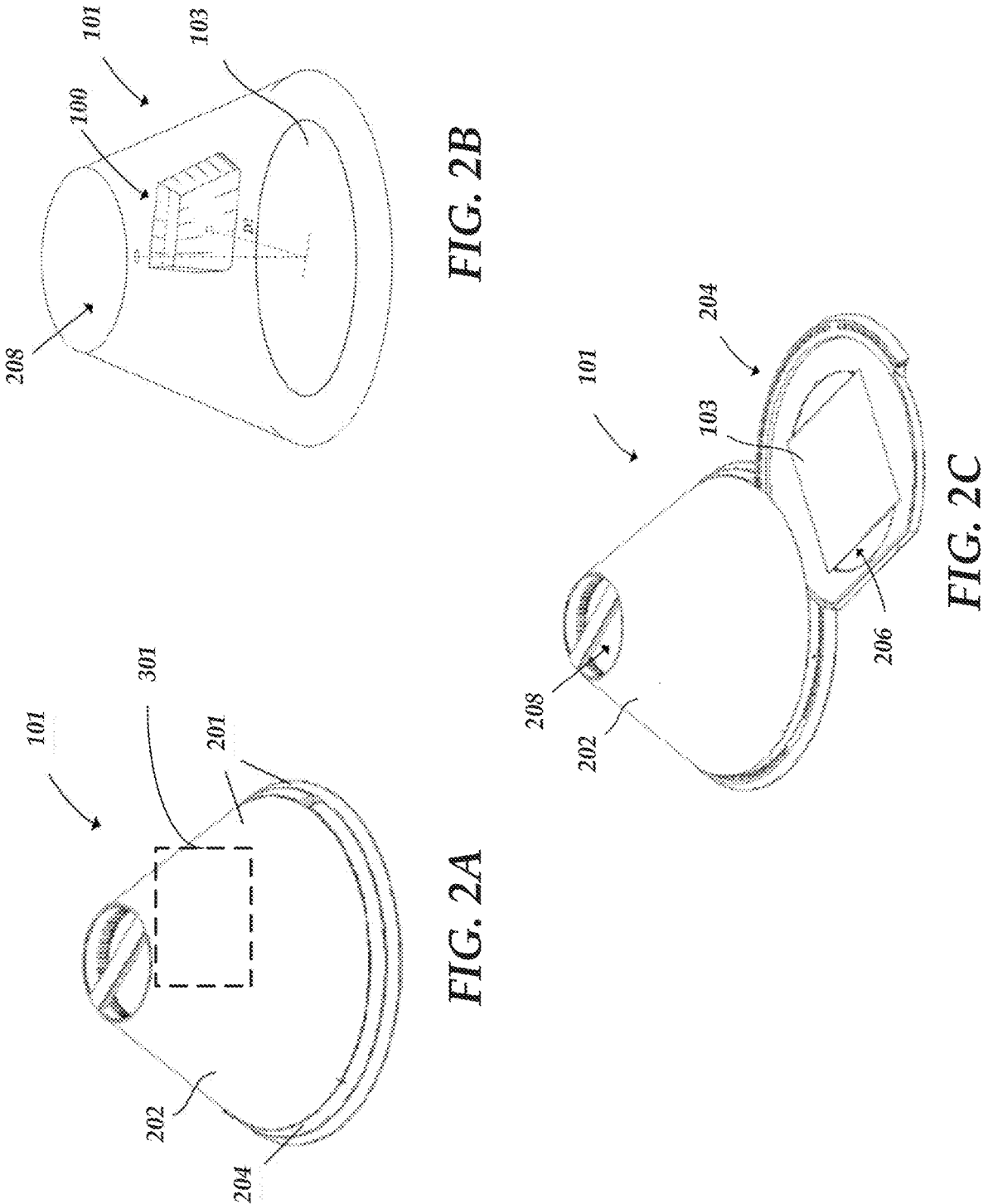
FIGS. 2A-2C illustrate a schematic perspective view of a photometric imaging apparatus in accordance with some examples of the present disclosure.

FIG. 2A illustrates a schematic view of the imaging apparatus 101. Some elements have been omitted from the schematic view to simplify the representation. The imaging apparatus 101 can include a housing 201 having two portions (e.g., a first portion 202 and a second portion 204). In these examples, the imaging device 104 may be removable relative to the housing 201. In some examples, the imaging device 104 may be a fixed imaging device relative to the housing 201 (e.g., fixed within or on the housing 105. In some cases, where an imaging device 104 is included, the first portion 202 can be an upper portion of the housing 201 including an inner volume 208 in which the lamps 100 and the imaging device 104 can be positioned. In some examples, as shown in FIG. 2B, a lamp 100 can be fixed in position in the inner volume 208 of the first portion 202 of the housing 201, such that the center 110 is a distance D2 away from the target area 103. Although FIG. 2B illustrates an example using a lamp 100. The second portion 204 can be a lower portion of the housing 201 that couples to the first portion 202. The second portion 204 can include the target area 103 located within a sample tray 206 upon which a sample can be placed for imaging. In some cases, the sample tray 206 can be accessed by rotating it outward or away from the first portion 202. Although FIG. 2C shows the second portion 204 in an open configuration in which the second portion 204 remains attached to the first portion 202, in some cases, the second portion 204 can be completely separated and detached from the first portion 202. In some examples, the second portion 204 can be separated from the first portion 202 through a rotating mechanism, such that the second portion 204 can be rotated away from the first portion 202 to make the sample tray 206 accessible to a user. In some cases, the second portion 204 can be displaced with respect to the first portion 202 through a non-rotating or linear sliding mechanism. In some examples, the first portion 202 may comprise an aperture to receive a sample tray 206 that is removable or movable relative to the first portion 202. In some cases, inserting the sample tray 206 of the second portion 204 completely into the aperture may function to block or reduce ambient light (or background light) from entering the near-light apparatus. In some examples, the target area 103 is a removable target area relative to the imaging device 104.

The first portion 202 can include a rigid conical structure to house at least a first lamp (e.g., lamp 100). The rigid conical structure can include an interior surface that is angled, such that when a lamp 100 is positioned on the interior surface, the lamp 100 may be positioned such that light emitted from the lamp will have a low grazing angle (e.g., approximately 30 degrees) relative to the target area 103. In some examples, where the imaging apparatus 101 includes eight lamps, the eight lamps can be arranged in an octagonal configuration that is approximately centered with respect to the imaging device 104. FIG. 2A also illustrates additional components, such as the controller 301 (shown in FIG. 1A as a dotted box). It is noted that some elements in FIG. 2A have been omitted in FIG. 2B and FIG. 2C.

In some examples, a photometric imaging system 300 (see FIG. 3) may correspond to an apparatus including the near-light imaging apparatus 101 and the near-light apparatus 200. The photometric imaging system 300 may include and use the lamps described in relation to FIGS. 1A and 1B (e.g., lamp 100). In some cases, a single lamp (e.g., lamp 100) may be used for illumination, and the single lamp can be moved to different positions relative to a target area 103. In some cases, multiple lamps (e.g., two or more lamps) may be used for illumination, and each of the lamps may be located at a different position relative to the target area 103. In some examples, the photometric imaging system 300 may include an imaging device 104 that is removable. In some examples, the photometric imaging system 300 may include an imaging device 104 that is fixed.

Figure 3:
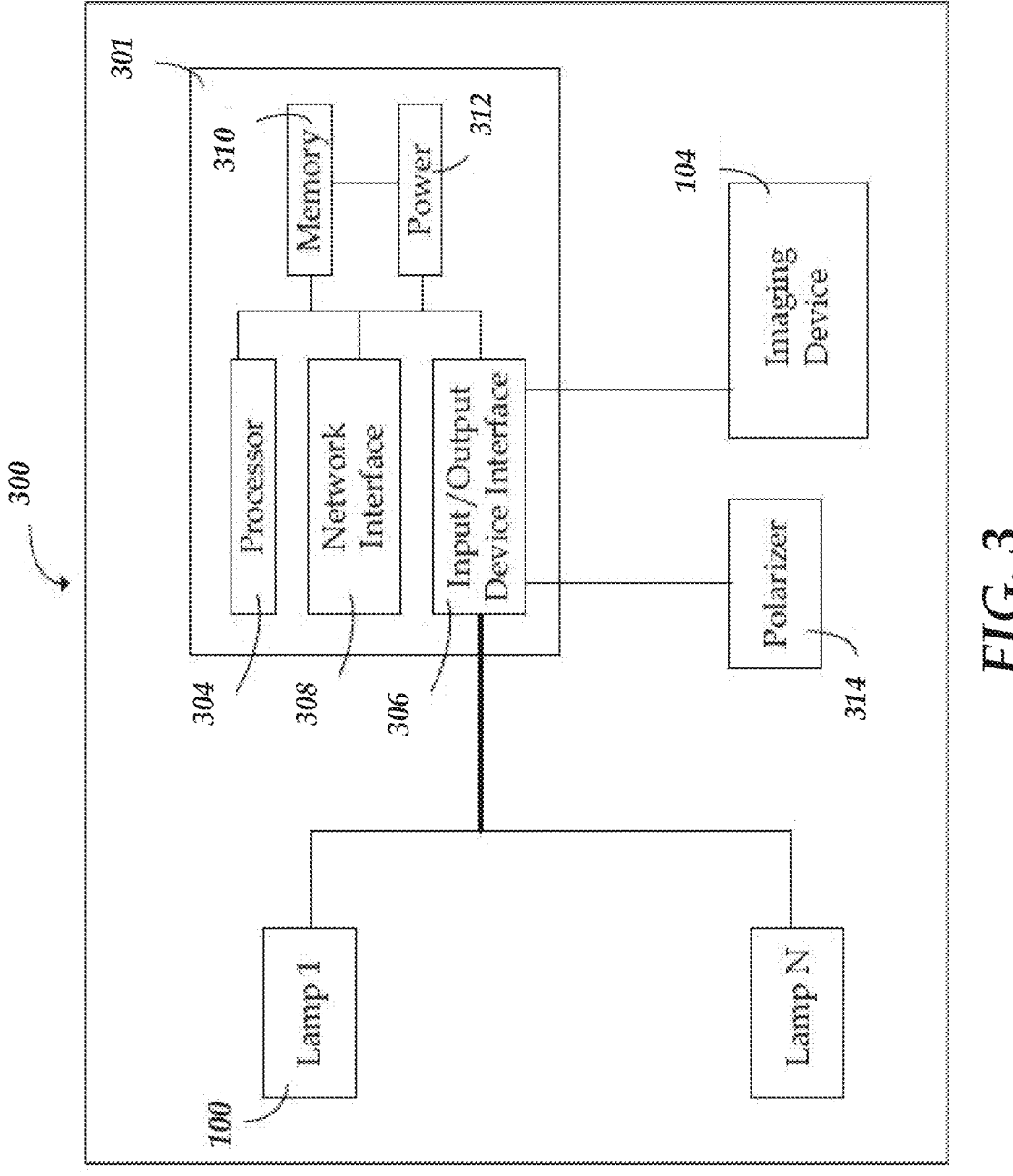
FIG. 3 illustrates a block diagram of at least some of the components of the photometric imaging apparatus in accordance with some examples of the present disclosure.

FIG. 3 illustrates a schematic block diagram depicting an illustrative general architecture of a photometric imaging system 300, which may include the imaging apparatus 101. Photometric imaging system 300 includes lamp 100, controller 301 (control or processing unit), and imaging device 104 (e.g., camera), and polarizer 314 to provide a plurality of polarizer view states. The photometric imaging system 300 can include more (or fewer) components than those shown in FIG. 3.

Imaging device 104 may be capable of capturing an image of a sample illuminated by a lamp 100. To capture the material surface of the sample illuminated by the lamp 100, the imaging device 104 may be configured to capture a plurality of images under a plurality of illumination and/or optical viewing settings (e.g., polarizer view states), collectively "image viewing settings." Image viewing settings can include any setting relating to the capture of an image illuminated by the lamp 100 or within the photometric imaging system 300. For example, image viewing settings can include at least one of a light orientation setting, a brightness level, a polarizer viewing state, and the like.

Controller 301 can include a processor 304, which may be an embedded processor, and an input/output device interface (e.g., I/O device interface 306). In some examples, the I/O device interface 306 can include a user interface (not shown) for operating or controlling the photometric imaging system 300 and/or data analysis. In some examples, the controller 301 can include a network interface 308. In some examples, the network interface 308 can allow for short-range wireless connections (e.g., Bluetooth® or Wi-Fi connection). The controller 301 components can communicate with one another by way of a communication bus. The controller 301 is associated with, or in communication with, at least one output device and at least one input device. For example, the output device can be the lamp 100 (e.g., Lamp 1-Lamp N, where N is greater than 1). The network and/or host computer interface 308 can provide the controller 301 with connectivity to one or more networks or computing systems. The processor 304 can thus receive information and instructions from other processing systems or services via a network (e.g., a wide area network (WAN), a wireless personal area network (WPAN), local area network (LAN), the Internet, etc.). The processor 304 can also communicate to and from the memory 310 and further provide output information (e.g., a plurality of images) for an output device (e.g., a display (not shown)) via the I/O device interface 306. The I/O device interface 306 can accept input from an input device (e.g., imaging data or information acquired from the camera). The memory 310 can contain computer program instructions that can be executed by the processor 304. In some examples, the memory 310 can include RAM, ROM, and/or other persistent or non-transitory computer-readable storage media. The controller 301 may further includes a power source for providing power 312 to the controller 301.

In some examples, the controller 301 facilitates the operation of at least one of each of the lamps 100 and the imaging device 104, which can be removable or fixed. For example, the controller 301 can control a brightness of the lamp 100 by adjusting an amount of current to be delivered to each lamp 100 to power the plurality of LEDs in each lamp 100. The controller 301 can additionally facilitate calibrating a lamp 100, in part, by sending signals to adjust a polarizer 314 (e.g., rotate a linear polarizer) along an optical pathway including the imaging device 104 relative to an individual lamp 100 having a linear polarizer film. Although FIG. 3 illustrates an example using a lamp 100, any of the lamps previously described can be used instead. The controller 301 can also function to operate the imaging device 104 such that the imaging device 104 can capture multiple images of the sample as the sample is illuminated from different directions. For example, the controller 301 can instruct the imaging device 104 to capture an image or otherwise acquire image data of a sample. The controller 301 can receive the image data and send the image data to the processor 304, which can facilitate obtaining a plurality of properties of the sample. These properties include properties of the sample's material. For example, these properties may include surface roughness, color, surface normal information, and more. These properties can subsequently be used in physically based rendering (PBR) processes, which can help provide an accurate representation of how light interacts with various materials.

In some examples, the controller 301 can send signals to the imaging device 104 to enable autofocusing of the imaging device 104 relative to the target area 103. In some examples, the controller 301 can facilitate an ordered acquisition (e.g., a user-defined order for acquiring images of a sample illuminated by individual lamps at different positions relative to the sample) by the imaging device 104 to capture a first image of the sample illuminated by a first lamp (e.g., lamp 100) and a second image of the sample illuminated by a second lamp (e.g., lamp 100). In some examples, the controller 301 can instruct the imaging device 104 to capture a first image of a sample with a first light setting and a second image of the sample with a second light setting. The first and second light settings are the light parameters to be implemented for an image acquisition. The first light setting can include at least a brightness and an orientation of the light. In some cases, the first light setting can be provided by the first lamp and the second light setting can be provided by a second lamp. In some cases, the first and the second light settings can be provided by the first lamp. Although multiple lamps are illustrated, a single lamp could be used instead, and the single lamp could provide different light settings where a light setting is associated with a different orientation of the single lamp relative to the sample (e.g., a first light setting corresponds to a first orientation and a second light setting corresponds to a second orientation). In some cases, the controller can facilitate rotating the single lamp relative to the sample and enable the camera to acquire images of the sample as it is illuminated by the single lamp at different positions. In some cases, the controller can facilitate rotating the sample relative to the single lamp and enable the imaging device to acquire images of the sample as it is rotated.

In some examples, the polarizer 314 may be disposed between the imaging device 104 and the sample. In some cases, the polarizer 314 may be a linear polarizer in which a polarization viewing state of the linear polarizer can be adjusted by rotating the linear polarizer. In some cases, the polarizer 314 may be an optical filter such as a liquid crystal tunable filter, where the polarization viewing state can be adjusted through varying a drive current provided to the liquid crystal tunable filter.

Figure 4:
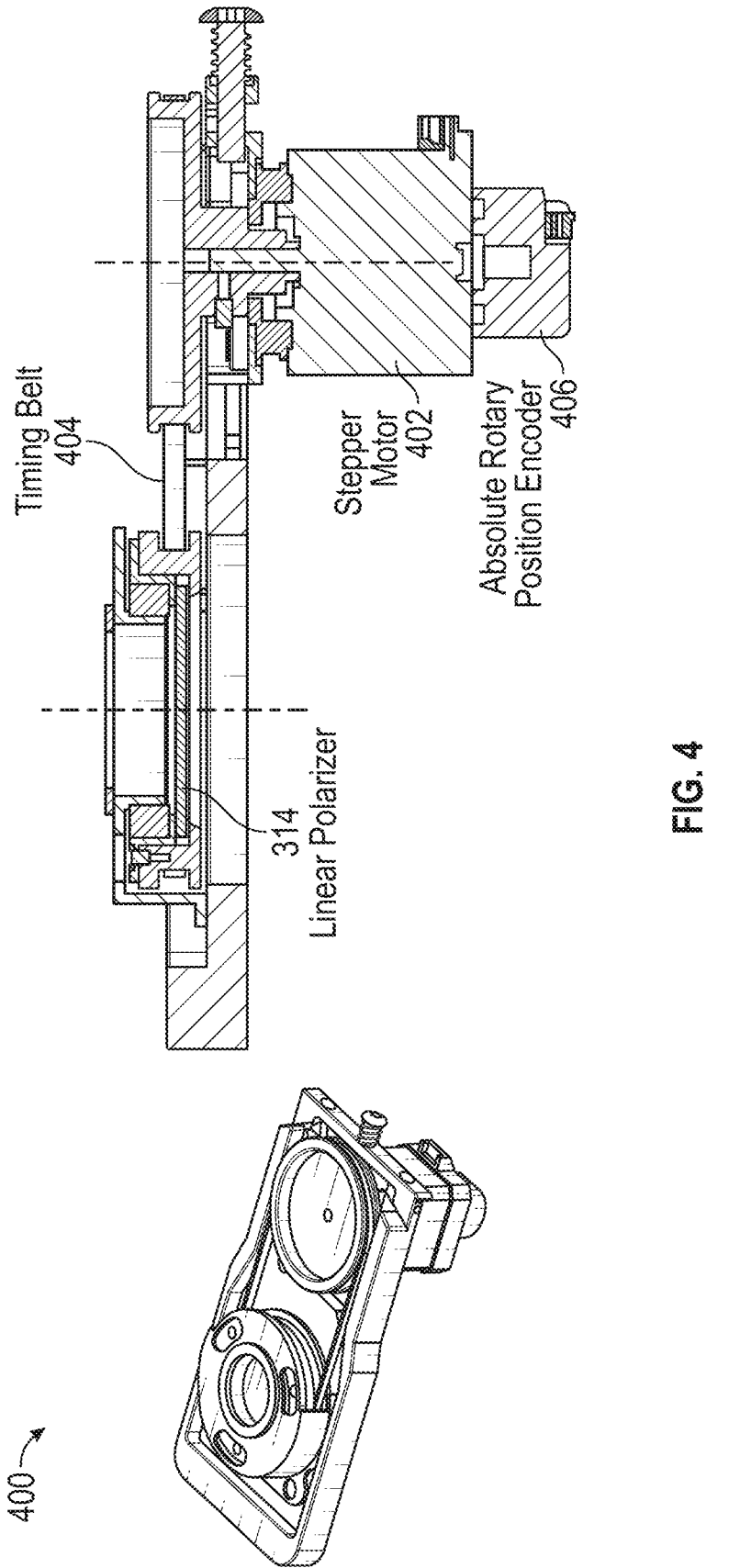
FIG. 4 illustrates a polarization viewer mechanism for use with a polarizer of the photometric imaging apparatus in accordance with some examples of the present disclosure.

FIG. 4 illustrates a polarization viewer mechanism 400 for use with a polarizer 314 of the photometric imaging system 300 in accordance with some examples of the present disclosure. Polarizer viewer mechanism 400 can move or rotate the polarizer 314 (e.g., linear polarizer) of the photometric imaging system 300. In some embodiments, the polarization viewer mechanism 400 moves the polarizer to various positions, e.g., polarizer view states. In order to view the material or object in various elliptical polarized states, the polarizer 314 can be rotated by the polarization viewer mechanism 400 to various polarizer view states (e.g., eight different states). As shown in FIG. 4, the polarization viewer mechanism 400 includes polarizer 314, stepper motor 402, timing belt 404, absolute rotary position encoder 406. Polarization viewer mechanism 400 can include more or less components than shown. As shown in FIG. 4, the polarizer 314 may be mounted, attached, fitted, connected, or otherwise integrated with the polarization viewer mechanism 400.

In some embodiments, the rotation of the polarizer 314 between different polarizer states can result in pixel shift of the resulting images. For example, slight changes in the plane of orientation of the polarizer 314 relative to the lens of the imaging device can cause the image to shift pixels with each change of the polarizer 314 orientation. In addition, the photometric imaging system 300 can capture images at various polarizer view states and at various lighting positions, resulting in pixel shifts between each configuration. However, by conducting the calibration operation disclosed herein, the pixel deviations arising from the use of the polarizer may be reduced.

Figure 5:
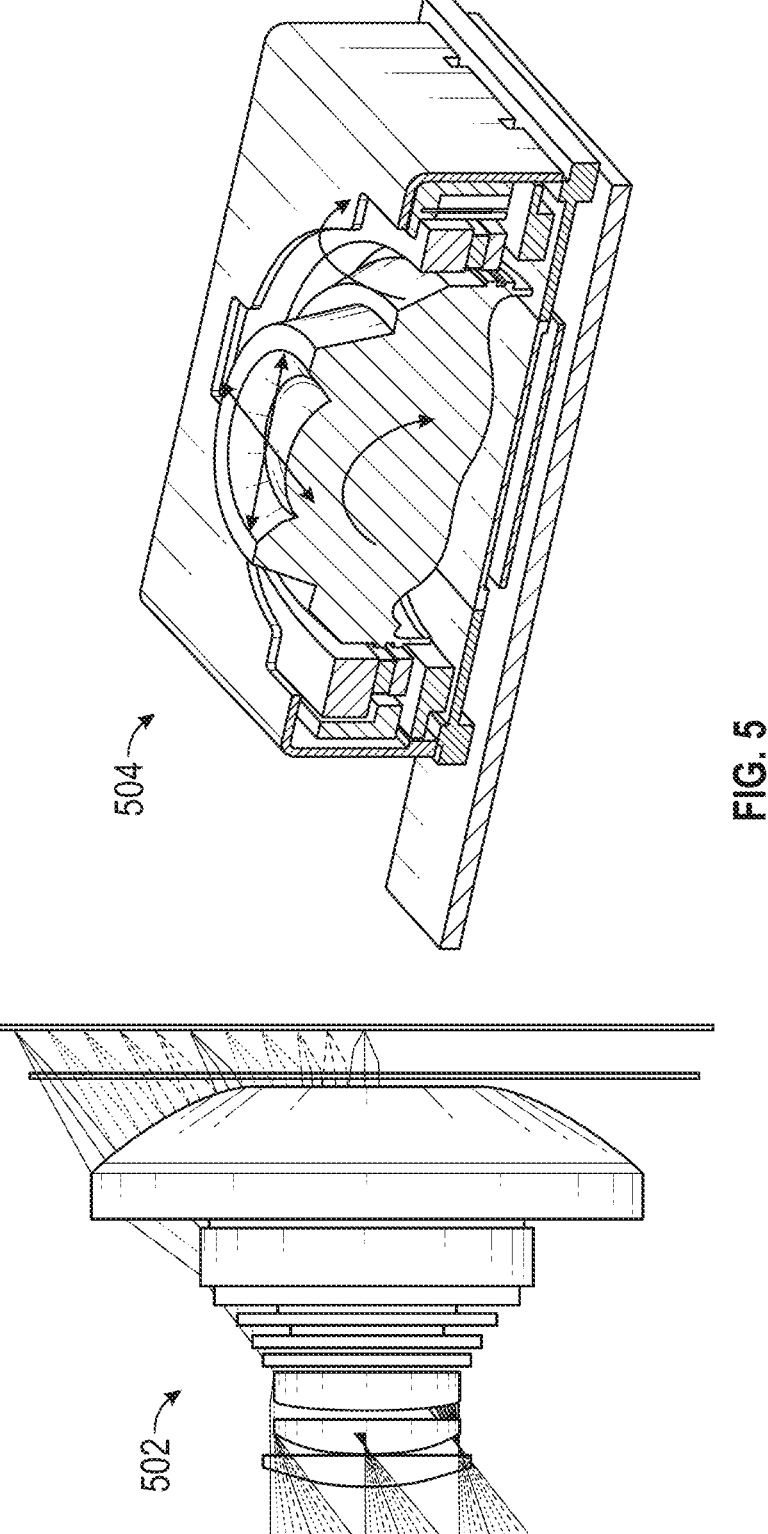
FIG. 5 illustrates a block diagram of at least some of the components of the photometric imaging system, including a micro-actuator, in accordance with some examples of the present disclosure.

FIG. 5 illustrates an optical image stabilization (OIS) system 500 of the photometric imaging system 300. In some embodiments, the OIS system 500 is in communication with an accelerometer placed adjacent to an imaging device to compensate for any vibration or other motion of the camera during image capture and to reduce image blurriness via optical image stabilization. The OIS system 500 can implement a manual and discrete step-wise offset positioning mode within the photometric imaging system 500. In some examples, the OIS system 500 may be used to adjust a relative position of a lens with respect to the imager during an imaging operation. In an example, OIS system 500 may correspond to the imaging device within the photometric imaging system 300. OIS system 500 includes lens 502 and micro-actuator 504. Lens 502 can be integrated as part of the imaging device 104. Lens 502 can include multiple lens arranged in a stack, as shown in FIG. 5.

Micro-actuator 504 may be any device or apparatus to move the lens 502 in at least one direction. In some examples, the micro-actuator 504 can move in the x and y directions, parallel to the sample. Micro-actuator 504 may have a range of motion of about ±160 μm in both the x and y directions. In addition, in some embodiments, the resolution of movement of the micro-actuator 504 is 12 bits, or 4096 steps (this translates to about 0.08 μm, which is about $\frac{1}{8}^{th}$ the size of a pixel).

OIS system 500 may receive instructions from the controller 301 relating to a calibration operation. In some embodiments, the instructions from the controller 301 include a distance to move the micro-actuator 504 in and x and/or y direction. In some examples, the instructions may be part of an offset data determined during the calibration operation.

Figure 6:
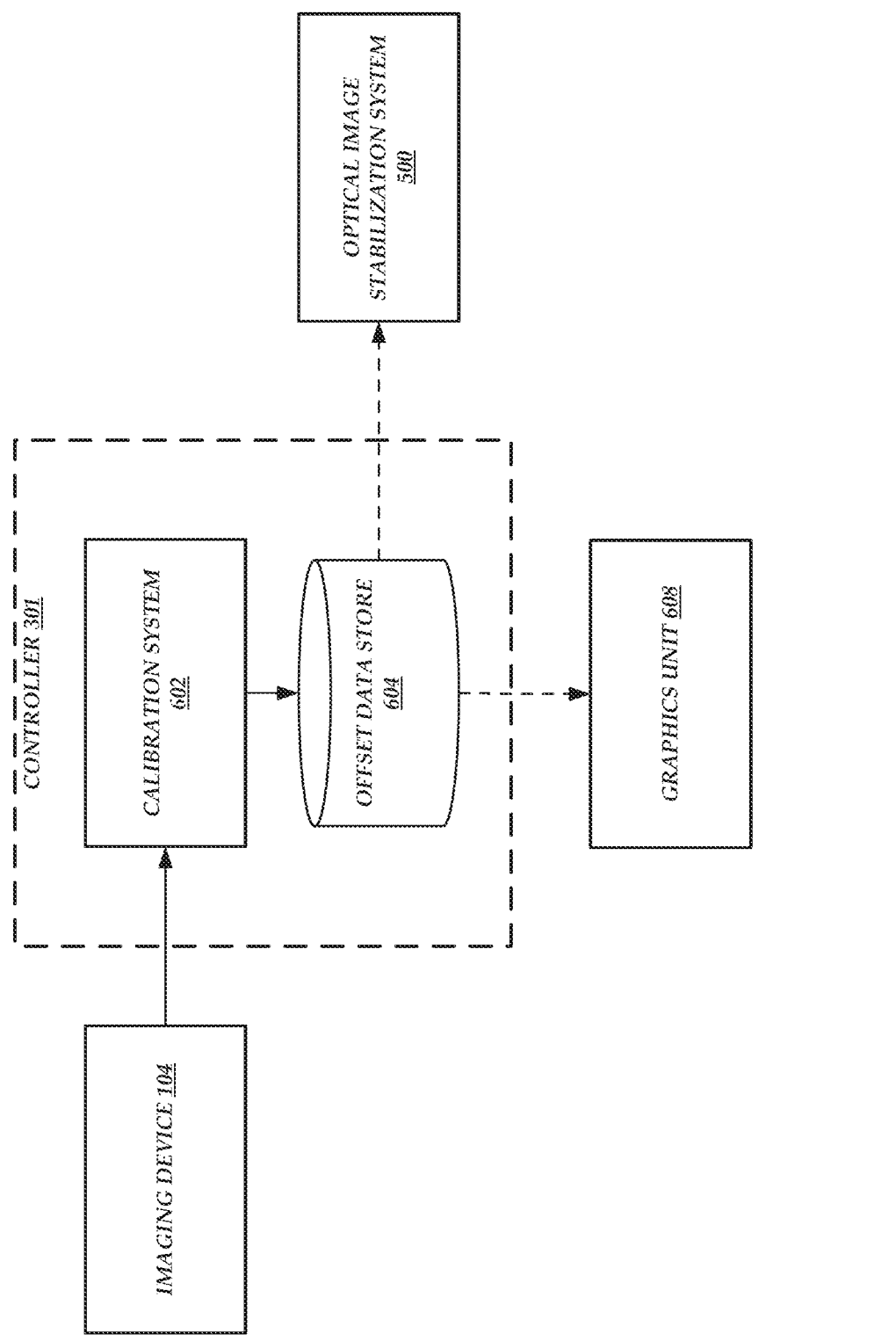
FIG. 6 illustrates a block diagram of at least some of the components of the photometric imaging system to execute a calibration operation.

FIG. 6 illustrates a block diagram of at least some of the components of the photometric imaging system 300 to execute a calibration operation. As described above, different factors may result in pixel deviations during an imaging operation. To correct for these pixel deviations, the photometric imaging system 300 can execute various calibration operations. As will be described below, the calibration system 602 can account for the various movements of the components between different configurations and adjust the photometric imaging system 300 accordingly.

As noted herein, controller 301 can instruct the imaging device 104 to capture images with various light or illumination settings or image viewing settings. Image viewing settings can include any setting relating to the capture of an image illuminated by the lamp 100 or within the photometric imaging system 300. For example, image viewing settings can include at least one of a light orientation setting, a brightness level, a polarizer viewing state, and the like. In some embodiments, the imaging device 104 captures an image using illumination settings associated with a photometric capture process. Photometric capture processes may include photometric stereo capture or spatially varying bidirectional reflectance distribution ("SVBRDF") capture.

In some embodiments, controller 301 instructs the imaging device 104 to capture a plurality of images. As described herein, photometric stereo capture systems, such as the photometric imaging system 300, may capture a plurality of images under various lighting conditions to model a shadow behavior of a material surface. The plurality of images may be used to derive a plurality of material channels (e.g., shadow placement can be used for estimating factors such as surface normal, roughness, curvature). In some embodiments, the controller 301 instructs the imaging device 304 to capture images at a plurality of light settings (e.g., eight illumination settings from eight lamps surrounding a target sample) and a plurality of polarizer view states. For example, the controller 301 may instruct the imaging device 104 to capture 2048 total images under a plurality of image viewing settings. Images captured by the imaging device 104 may be a uniform file size, such as 250 Mb, or may vary in size.

Imaging device 104 may capture images of a sample illuminated by a plurality of light sources according to processes described above. In addition, to calibrate the photometric imaging system 300, the imaging device 104 may capture an image (or plurality of images) of the target area of a sample including a fiducial on the image. A fiducial may refer to any marker or object placed in the field of view of the imaging device 104 to be used as a point of reference or measure. The fiducial can include any indicator, such as a Secchi disk, a shape, a grid, a letter, a pattern, or the like. In some embodiments, the imaging device 104 captures a first image with a fiducial as a reference image. The imaging device 104 may then capture a subsequent image (or plurality of subsequent images) containing the fiducial for comparison to the reference photo to determine the required calibration. In some embodiments, the fiducial may be illuminated under various illumination settings.

Calibration system 602 may calibrate the photometric imaging system 300. In some embodiments, the calibration system 602 calibrates the photometric imaging system 300 based on an image captured by the imaging device 104. For example, the calibration system 602 may access an image captured by the imaging device 104 containing a fiducial for use as a reference image to calibrate the photometric imaging system 300. Calibration system 602 may determine a location of the fiducial on the image captured by the imaging device 104 at a first illumination setting (e.g., first polarizer view state). In some embodiments, the location of the fiducial on the image corresponds to a pixel coordinate pair, e.g., (X, Y), in a coordinate plane. Upon movement of the polarizer 314 or other change in illumination or image viewing settings, the calibration system 602 may determine a location of the fiducial on a second image captured by the imaging device 104 at a second illumination setting (e.g., second polarizer view state). Similar to the first location, the second location of the fiducial on the second image can correspond to a pixel coordinate pair in the coordinate plane. Upon the determination of both locations, the calibration system 602 may determine a pixel deviation. The pixel deviation may refer to the difference or distance between the location of the fiducial on the first image and the location of the fiducial on the second image.

Offset data may be determined by the calibration system 602 based on the pixel deviation. Offset data can refer to any information, data, direction, or instruction relating to a calibration to be performed to or by the photometric imaging system 300 to account for the pixel deviation determined by the calibration system 602. Calibration system 602 may determine offset data based on the pixel deviation. In some embodiments, offset data includes an instruction to the OIS system 500 for movement of the micro-actuator 504 to reposition the lens 502. For example, the offset data determined by the calibration system 602 may include a determined distance (x and/or y directions) based on the pixel deviation. Offset data may be stored in the offset data store 604 for access by the controller 301 and/or other components of the photometric imaging system 300.

In response to the generation and storage of the offset data, the photometric imaging system 300 may perform or execute a resulting calibration operation. For example, in the case when the offset data includes a movement instruction to the OIS system 500, the controller 301 may prompt the micro-actuator 504 to be repositioned according to the offset data.

In some embodiments, the offset data includes pixel deviation information to be corrected by another process of the photometric imaging system 300. For example, the graphics unit 408 may access the offset data stored in the offset data store 604. Graphics unit 608 may be a component of the controller 301 that executes various image processing tasks on the plurality of images. In some cases, operations performed by the graphics unit 608 may be performed by the processor 304 in response to executing instructions stored in the memory 310. Image processing tasks executed by the graphics unit 608 can include any task, process, technique, or procedure relating to PBR processing. For example, image processing tasks can include at least one of a high dynamic range (HDR) processing, signal-to-noise (S/N) enhancement, varied polarization elliptical state images capture, pixel shift registration, time delay integration (TDI), color correction, de-mosaicking, camera lens temperature change inducing changes in the lens focal characteristics, insertion or inclusion of optical color/wavelength filters, inclusion of active electro-optic elements such as a liquid crystal (LCD) polarization compensator and environment displacement (vibration or other) of the image capture environment, and other custom image signal processing (ISP) image manipulations. In some embodiments, the graphics unit 608 can access the offset data stored in the offset data store 604 to execute a pixel shift image processing task on subsequent images captured by the photometric imaging system 300.

Figure 7:
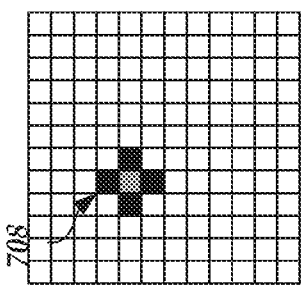
FIG. 7 illustrates an example pixel deviation calculation performed by the photometric imaging system in accordance with some examples of the present disclosure.
Figure 7:
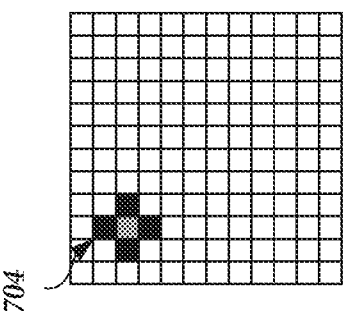

FIG. 7 illustrates an example pixel deviation calculation performed by the calibration system 602 of the photometric imaging system in accordance with some examples of the present disclosure. First image 702 and second image 704 are shown in FIG. 7 as 12×12 pixel images for illustrative purposes and not to limit the present disclosure. It is noted that the photometric imaging system 300 may capture images with higher resolutions.

First image 702 may be captured by the imaging device 104 according to processes described herein. For example, the imaging device 104 may capture first image 702 of a sample illuminated by a plurality of light sources at a plurality of polarizer view states. In some examples, the first image 702 is captured by the imaging device 104 at a first illumination setting, which may include a first light source and a first polarizer view state. First image 702 includes first fiducial 704. First fiducial 704 is cross-shaped, with a center pixel shown in gray. To calibrate the photometric imaging system 300, the calibration system 602 may determine a location of the first fiducial 704. The location of the first fiducial 704 may correspond to a pixel coordinate pair in a coordinate plane. For example, the first fiducial 704 has a center point (e.g., center pixel) at (3, −3) (given that (0, 0) is the top left corner of the first image 702). This location may be stored by the calibration system 602 and used as a reference location for subsequent images captured by the imaging device 104 at different polarizer states or different illumination settings.

Second image 706 may also be captured by the imaging device 104 according to processes described herein. For example, the imaging device 104 may capture the second image 706 of the sample illuminated by a plurality of light sources at a plurality of polarizer view states. In some examples, the second image 706 is captured by the imaging device 104 at a second illumination setting, which may include a second light source and/or a second polarizer view state. Second image 706 includes second fiducial 708. Second fiducial 708 may correspond to the same fiducial (as in first fiducial 704) that appears in the second image 706. However, due to movement of the polarizer 314 and other factors (e.g., the light direction used for illuminating the sample), the location of second fiducial 708 may be different than the location of the fiducial 704 on the first image 702. The calibration system 602 may determine a location of the second fiducial 708 on the second image 706. The location of the second fiducial 708 may correspond to a pixel coordinate pair in the coordinate plane. For example, the second image 706 has a center point (e.g., center pixel) at (5, −5) (given that (0, 0) is the top left corner of the second image 706).

To determine a pixel deviation, the calibration system 602 may determine a difference between the location of the first fiducial 704 on the first image 702 and the second fiducial 708 on the second image 706. For example, the second fiducial 708 appears to be offset from the first fiducial 704 by (2, −2). In some embodiments, the calibration system 602 determines offset data based on the pixel deviation. For example, instructions to move the micro-actuator 504 based on the pixel deviation can be generated by the calibration system 602. These instructions and other offset data may be stored in the offset data store 604.

FIG. 8 illustrates an example process 800 for execution of a calibration operation. The calibration operation process 800 may be performed by any of the imaging devices and imaging systems previously described in reference to FIGS. 1A to 3. Specifically, the routine 800 can be executed by the various components of the photometric imaging system 300, such as via the controller 301, as shown in FIG. 3 and FIG. 6.

At block 802, a target area including a set of fiducials is illuminated with a light source in accordance with different image viewing settings. In some embodiments, the light source illuminates the target area in accordance with illumination settings, such as those described herein. In some embodiments, the controller controls the light source to subsequently illuminate the fiducial with different illumination settings or different image viewing settings. Illumination settings or image viewing settings can include light orientation settings, brightness levels, or the plurality of polarizer viewing states. In some embodiments, the different image viewing settings include different directions of the light source being emitted towards the set of fiducials.

At block 804, images of the set of fiducials illuminated by the light source with different image viewing settings is captured. The first image (or images) of the target area illuminated by the light source are captured by the imaging device 104. As described herein, the imaging device 104 may be capable of capturing an image of a target area illuminated by the lamp 100. In some examples, the target area may include a sample. To capture the material surface of the sample illuminated by the lamp 100, the imaging device 104 may be configured to capture a plurality of images under a plurality of illumination viewing settings. In some embodiments, the imaging device is to capture the images sequentially illuminated by the plurality of lamps at a plurality of polarizer viewing states, wherein for each polarizer viewing states, a first lamp illuminates the fiducial while a second lamp is turned off.

At block 806, process 800 comprises controlling the light source to illuminate the set of fiducials with different image viewing settings. For example, in some embodiments, the light source or the image viewing setting is modified. As noted herein, illumination settings or image viewing settings can include light orientation settings (e.g., different light sources, different light positions), brightness levels, or a polarizer setting. In some embodiments, polarizer settings include various rotational positions of the polarizer (e.g., view states). The controlling of the illumination setting can include the modification from a first illumination setting (e.g., first polarizer view state) to a second illumination setting (e.g., second polarizer view state). The controlling of the illumination state can include a rotation of the polarizer 314 from a first position to a second position. In some embodiments, the light source includes a first lamp element to illuminate the target area at a first image viewing setting at a first time and a second lamp element to illuminate the target area at a second image viewing setting at a second time.

At block 808, a location of the set of fiducials on the images is determined. In some embodiments, the locations of the set of fiducials on the images captured by the imaging device at the different image viewing settings is determined. In some embodiments, the location of the fiducials on the first image or images corresponds to a first pixel coordinate pair in a coordinate plane, such as shown in FIG. 7. A fiducial may refer to any marker or object placed in the field of view of the imaging device 104 to be used as a point of reference or measure. The fiducial can include any type of indicator, such as a Secchi disk, a shape, a grid, a letter, a pattern, or the like. In some embodiments, the imaging device 104 captures a first image with a fiducial as a reference image. The imaging device 104 may then capture a subsequent image (or plurality of subsequent images) containing the fiducial for comparison to the reference photo to determine potential calibration adjustments. In some embodiments, the fiducial may be illuminated under various illumination settings.

At block 810, a first pixel deviation between the determined locations is calculated. Second fiducial 708 may correspond to the same fiducial (as in first fiducial 704) that appears in the second image 706. However, due to movement of the polarizer 314 etc., the location of second fiducial 708 may be different than the location of the fiducial 704 on the first image 702. The calibration system 602 may determine a location of the second fiducial 708 on the second image 706. The location of the second fiducial 708 may correspond to a pixel coordinate pair in the coordinate plane. For example, the second image 706 has a center point (e.g., center pixel) at (5, −5) (given that (0, 0) is the top left corner of the second image 706).

At block 812, the offset data is determined based on the pixel deviations. In some embodiments, the photometric imaging operation includes an instruction, an image processing task, or other process executed by the photometric imaging system 300. For example, based on the offset data, the controller 301 may adjust a relative position of the lens 502 of the imaging device 104 during an imaging operation. The controller 301 may adjust the relative position of the lens 502 using the micro-actuator 504, such as in the x and/or y directions. In some embodiments, the controller 301 may adjust the relative position of the lens 502 to adjust the first pixel coordinate pair of the fiducial on the first image and/or the second pixel coordinate pair of the fiducial on the second image. Additionally, or alternatively, the controller 301 may adjust the relative position of the lens 502 when the pixel deviation is beyond a deviation threshold. The deviation threshold may correspond to a distance, number of pixels, or another threshold relating to a difference in fiducial locations between the images. In some cases, the deviation threshold may be based on the granularity of movement supported by the OIS micro-actuator or any other mechanism involved in the movement of the lens 502.

In some embodiments, the offset data is stored for use in a photometric imaging operation. In some embodiments, the photometric imaging operation includes an instruction, an image processing task, or other process executed by the photometric imaging system 300. For example, based on the offset data, the controller 301 may adjust a relative position of the lens 502 of the imaging device 104. The controller 301 may adjust the relative position of the lens 502 using the micro-actuator 504, such as in the x and/or y directions. In some embodiments, the locations of the set of fiducials on the images correspond to pixel coordinate pairs in a coordinate plane. As such, in some embodiments, the controller 301 may adjust the relative position of the lens 502 to adjust the first pixel coordinate pair of the fiducial on the first image and/or the second pixel coordinate pair of the fiducial on the second image. Additionally, or alternatively, the controller 301 may adjust the relative position of the lens 502 when the pixel deviation is beyond a deviation threshold. The deviation threshold may correspond to a distance, number of pixels, or another threshold relating to a difference in fiducial locations between the images. In some cases, the deviation threshold may be based on the granularity of movement supported by the stepper motor 402 or any other mechanism involved in the movement of the lens 502. In some embodiments, in a photometric imaging operation in the photometric imaging device, the controller can adjust a relative position of the lens of an imager of the imaging device based on the offset data. In some embodiments, offset data comprises an adjustment to a relative position of a lens of an imager of the imaging device based on the pixel coordinate pairs.

In some embodiments, the controller 301 may execute a pixel shift image processing task on the second or subsequent images based on the offset data. In some embodiments, the graphics unit 608 can access the offset data stored in the offset data store 604 to execute a pixel shift image processing task on subsequent images captured by the photometric imaging system 300. In some examples, the controller 301 applies the pixel shift correction to the photometric imaging system 300 in parallel to the photometric imaging operation in which a sample is received on a target area of the photometric imaging system. In some embodiments, the controller is further to apply a pixel shift correction to the photometric imaging system in parallel to the photometric imaging operation in which the sample is received on a target area of the photometric imaging system. In some embodiments, the controller is further to execute a pixel shift image processing task on the images based on the offset data during an image capture operation executed by the photometric imaging system.

In some examples, the calibration system 602 may determine the locations of multiple fiducials between the first and second images (or additional images captured by the imaging device 104). For example, the calibration system 602 may determine a location of a second fiducial on the first image captured by the imaging device 104 at a first illumination setting and a location of a second fiducial on the second image captured by the imaging device 104 at a second illumination setting. A second pixel deviation between these locations may be calculated. In addition, offset data based on at least in part on the first pixel deviation, determined at block 812, and the second pixel deviation may be determined. In some embodiments, the offset data is determined by averaging the first pixel deviation and the second pixel deviation. Averaging the first pixel deviation and the second pixel deviation may comprise determining a weighted average based at least in part on the location of the first fiducial and the location of the second fiducial.

In some examples, the calibration system 602 may determine that no calibration is needed. Based on the processes described above, the calibration system 602 may determine that the pixel coordinate pairs (or location) of the fiducial between the first (or reference) image is aligned with the location of the fiducial on subsequent images. In some examples, the calibration system 602 determines that the difference in locations between the fiducial on the first and second images is less than a deviation threshold (e.g., less than the motor step/resolution size). In such cases, although there may exist a pixel shift, no calibration action is taken because, for example, the pixel shift does not satisfy the deviation threshold. In some embodiments, for each of a plurality of polarizer view states, the controller is to determine the offset data and calibrate a relative position of a lens of the imaging device based on the offset data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of electronic devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable electronic device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIGS. should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A photometric imaging device, comprising:
a light source to illuminate a target area including a set of fiducials in accordance with different image viewing settings, wherein the different image viewing settings comprise different directions of the light source being emitted towards the set of fiducials;
an imaging device to capture images of the set of fiducials illuminated by the light source with the different image viewing settings;
a controller to:
control the light source to subsequently illuminate the set of fiducials with the different image viewing settings;
determine locations of the set of fiducials on images captured by the imaging device at the different image viewing settings;
calculate pixel deviations between the determined locations; and
determine offset data based at least in part on the pixel deviations.

2. The photometric imaging device of claim 1, wherein in a photometric imaging operation in the photometric imaging device, the controller is further to adjust a relative position of a lens of an imager of the imaging device based on the offset data.

3. The photometric imaging device of claim 1, wherein the locations of the set of fiducials on the images correspond to pixel coordinate pairs in a coordinate plane.

4. The photometric imaging device of claim 1, wherein the controller is further to store the determined offset data for use in a photometric imaging operation in the photometric imaging device.

5. The photometric imaging device of claim 1, further comprising a micro-actuator, wherein the controller is further to adjust a relative position of a lens of an imager of the imaging device utilizing the micro-actuator.

6. The photometric imaging device of claim 3, wherein the offset data comprises an adjustment to a relative position of a lens of an imager of the imaging device based on the pixel coordinate pairs.

7. The photometric imaging device of claim 1, wherein the controller is further to adjust a relative position of a lens of an imager of the imaging device when the pixel deviations are beyond a deviation threshold.

8. The photometric imaging device of claim 1, wherein the controller is further to execute a pixel shift image processing task on at least one of the images based on the offset data.

9. The photometric imaging device of claim 1, wherein the controller is further to execute a pixel shift image processing task on at least one of the images when the pixel deviations are beyond a deviation threshold.

10. The photometric imaging device of claim 1, wherein the set of fiducials includes at least one of a Secchi disk, a shape, a grid, a letter, or a pattern.

11. The photometric imaging device of claim 1, wherein the set of fiducials includes a first fiducial and a second fiducial, and wherein the controller is further to:

calculate pixel deviations between the locations of the first fiducial on the images;

calculate pixel deviations between the locations of the second fiducial on the images; and wherein the controller is to determine the offset data based at least in part on the pixel deviations of the locations of the first fiducial and the second fiducial on the images.

12. The photometric imaging device of claim 1, wherein the offset data is determined by averaging the pixel deviations.

13. The photometric imaging device of claim 1, wherein averaging the pixel deviations comprises determining a weighted average based at least in part on the locations of the set of fiducials.

14. The photometric imaging device of claim 1, wherein the light source includes a first lamp element to illuminate the target area at a first image viewing setting at a first time and a second lamp element to illuminate the target area at a second image viewing setting at a second time.

15. A photometric imaging system, comprising:

a plurality of lamps;

an imaging device to capture images of a fiducial illuminated by lamps from different relative locations;

a polarizer to provide a plurality of polarizer view states;

a controller to:

determine locations of the fiducial on the images, the images captured by the imaging device at the plurality of polarizer view states and illuminated by the lamps from the different relative locations;

calculate pixel deviations between the determined locations;

determine offset data based at least in part on the pixel deviations; and store the determined offset data for use in a photometric imaging operation of a sample in the photometric imaging system.

16. The photometric imaging system of claim 15 wherein the controller is further to apply a pixel shift correction to the photometric imaging system in parallel to the photometric imaging operation in which the sample is received on a target area of the photometric imaging system.

17. The photometric imaging system of claim 15, wherein the imaging device is to capture the images sequentially illuminated by the plurality of lamps at a plurality of polarizer viewing states, wherein for each polarizer viewing states, a first lamp illuminates the fiducial while a second lamp is turned off.

18. The photometric imaging system of claim 15, wherein the controller is further to execute a pixel shift image processing task on at least one of the images based on the offset data during an image capture operation executed by the photometric imaging system.

19. A non-transitory computer-readable medium storing specific computer-executable instructions that, when executed by a processor of a computing device, cause the computing device to at least:

capture, by an imaging device, images including a set of fiducials illuminated by a light source under a plurality of image viewing settings, wherein the plurality of image viewing settings includes illumination from the light source from different directions;

determine locations of the set of fiducials on the images;

calculate pixel deviations between the locations of the set of fiducials on the images; and determine offset data based at least in part on the pixel deviations.

20. The non-transitory computer-readable medium of claim 19, wherein the specific computer-executable instructions further cause the computing device to: for each of a plurality of polarizer view states, determine the offset data and calibrate, in a photometric imaging operation, a relative position of a lens of the imaging device based on the offset data.

* * * * *